(12) United States Patent
Holz et al.

(10) Patent No.: US 10,692,098 B2
(45) Date of Patent: Jun. 23, 2020

(54) PREDICTING CONTENT CONSUMPTION

(71) Applicant: Yahoo!, Inc., Sunnyvale, CA (US)

(72) Inventors: Christian Holz, San Francisco, CA (US); Frank Richard Bentley, San Francisco, CA (US); Ayman Farahat, Santa Clara, CA (US)

(73) Assignee: Oath Inc., New York, NY (US)

( * ) Notice: Subject to any disclaimer, the term of this patent is extended or adjusted under 35 U.S.C. 154(b) by 631 days.

(21) Appl. No.: 14/710,096

(22) Filed: May 12, 2015

(65) Prior Publication Data
US 2016/0335645 A1 Nov. 17, 2016

(51) Int. Cl.
G06Q 30/02 (2012.01)
G06Q 10/06 (2012.01)

(52) U.S. Cl.
CPC ....... G06Q 30/0201 (2013.01); G06Q 10/067 (2013.01)

(58) Field of Classification Search
CPC .......... G06Q 30/0201; G06Q 10/067
USPC ............. 705/7.29; 707/624; 726/26; 706/46; 709/203; 455/418; 719/328
See application file for complete search history.

(56) References Cited

U.S. PATENT DOCUMENTS

| 8,745,759 B2 * | 6/2014 | Halas | G06F 21/6218 726/26 |
| 9,591,345 B2 * | 3/2017 | Pyhalammi | H04N 21/4126 |
| 2003/0061280 A1 * | 3/2003 | Bulson | H04L 29/06027 709/203 |
| 2007/0101440 A1 * | 5/2007 | Bhatia | G06F 21/552 726/28 |
| 2010/0017812 A1 * | 1/2010 | Nigam | G06F 8/20 719/328 |
| 2013/0316687 A1 * | 11/2013 | Subbaramoo | H04M 1/605 455/418 |
| 2014/0279787 A1 * | 9/2014 | Cheng | G06F 8/60 706/46 |

(Continued)

FOREIGN PATENT DOCUMENTS

JP 2006279428 A * 10/2006 ......... H04N 21/8358

OTHER PUBLICATIONS

Mark Schaefer, Content Shock Why content marketing is not a sustainable strategy, 2014 (Year: 2014).*

*Primary Examiner* — Tarek Elchanti
(74) *Attorney, Agent, or Firm* — Cooper Legal Group, LLC

(57) ABSTRACT

Methods and systems for predicting content consumption are provided herein. An application log of a user, comprising a user's application data, and a viewing log of the user, comprising the user's viewing data (e.g., television programs watched by the user), may be evaluated over a time period to construct a model. The model may comprise a correlation between the viewing log and the application log during the time period (e.g., what applications the user interacts with while watching a program). Second application data, regarding application usage of a second user, may be extracted. The model may be applied to the second application data to identify an expected viewing action of the second user (e.g., what program the second user is likely to watch during the time period based upon applications used by the second user). The second user may be provided with content related to the expected viewing action.

20 Claims, 10 Drawing Sheets

(56) References Cited

U.S. PATENT DOCUMENTS

| | | | | |
|---|---|---|---|---|
| 2015/0169615 A1* | 6/2015 | Batchu | ............ | G06F 17/30557 |
| | | | | 707/624 |
| 2016/0335664 A1* | 11/2016 | Ray | ................... | G06Q 30/0242 |
| 2017/0117712 A1* | 4/2017 | Cao | ......................... | H02J 7/00 |
| 2017/0206144 A1* | 7/2017 | Ahn | ................... | G06F 11/1451 |
| 2017/0213007 A1* | 7/2017 | Moturu | ................. | G06F 19/00 |

* cited by examiner

PREDICTING CONTENT CONSUMPTION

BACKGROUND

Users may view one or more programs (e.g., television shows, movies, sporting events, etc.) while utilizing one or more applications (e.g., social media applications, sports news applications, news applications, etc.). Content providers of programs and/or applications may desire to present users with relevant content, such as content related to the programs and/or applications that the user views and/or with which the user interacts. However, if a content provider provides merely applications, then the content provider may lack a mechanism to determine what programs a user is viewing. Conversely, if the content provider provides merely programs, then the content provider may lack a mechanism to determine what applications the user is utilizing.

SUMMARY

In accordance with the present disclosure, one or more systems and/or methods for predicting content consumption are provided. In an example, viewing data regarding viewing actions of a user on a viewing device may be extracted. In an example, application data regarding application usage of the user on a client device may be extracted. The user may be identified based upon the viewing device and/or the client device having shared or similar login credentials, account information, IP addresses, communication connections, etc. A viewing log, for the user, may be generated based upon the viewing data (e.g., what programs, televisions shows, movies, and/or other content the user has viewed). An application log, for the user, may be generated based upon the application data (e.g., applications, such as mobile apps, with which the user has interacted with while viewing content).

The viewing log and the application log may be evaluated over a time period (e.g., 30 minutes) to construct a model comprising a correlation between the viewing log and the application log during the time period. External data about programs, such as a program and a second program available on the viewing device during the time period, may be applied to the model. For example, responsive to the external data indicating a greater number of users are viewing the program as compared to the second program, the model may be constructed to assign a higher likelihood score to the program relative to the second program (e.g., where a higher likelihood score indicates that the program is more likely to be viewed by a second user).

The viewing log may comprise an application that the user utilizes during an event (e.g., an advertisement, a song, a catchphrase, a performance, and/or an appearance of an actor or actress during the program) during the program. For example, during a championship game, many users may access a social networking application during a half time show, and thus the second user may be provided with a recommendation to access the social networking application (e.g., a recommendation of a particular social network post shared and/or viewed by users that are watching the championship game and/or the half time show).

Second application data regarding application usage of the second user may be extracted. The model may be applied to the second application data to identify an expected viewing action of the second user (e.g., what program the second user is likely watching during the time period). The second user may be provided with content related to the expected viewing action. The second user may be provided with an application recommendation based upon the expected viewing action (e.g., if the second user is watching a similar show as what the user was watching, as indicated by the viewing log and the model, then an application, accessed by the user while watching the show, may be suggested to the second user). A time may be identified during the program when a probability indicates the second user is not viewing the program (e.g., such as when the second user is utilizing applications). Responsive to the expected viewing action comprising an identification of the program as a suggestion for the second user, information about the program may be added to a user interest profile of the second user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
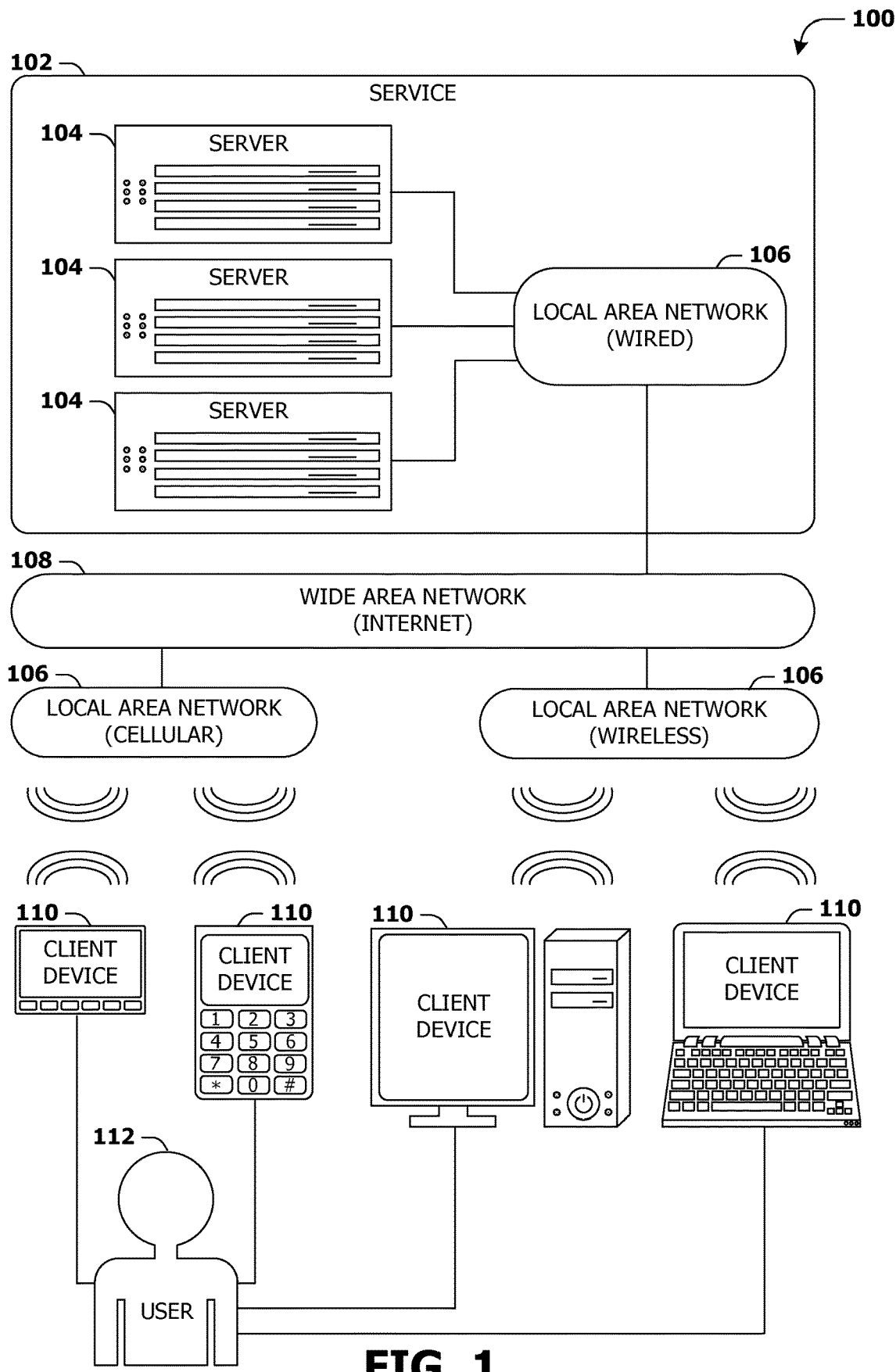
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
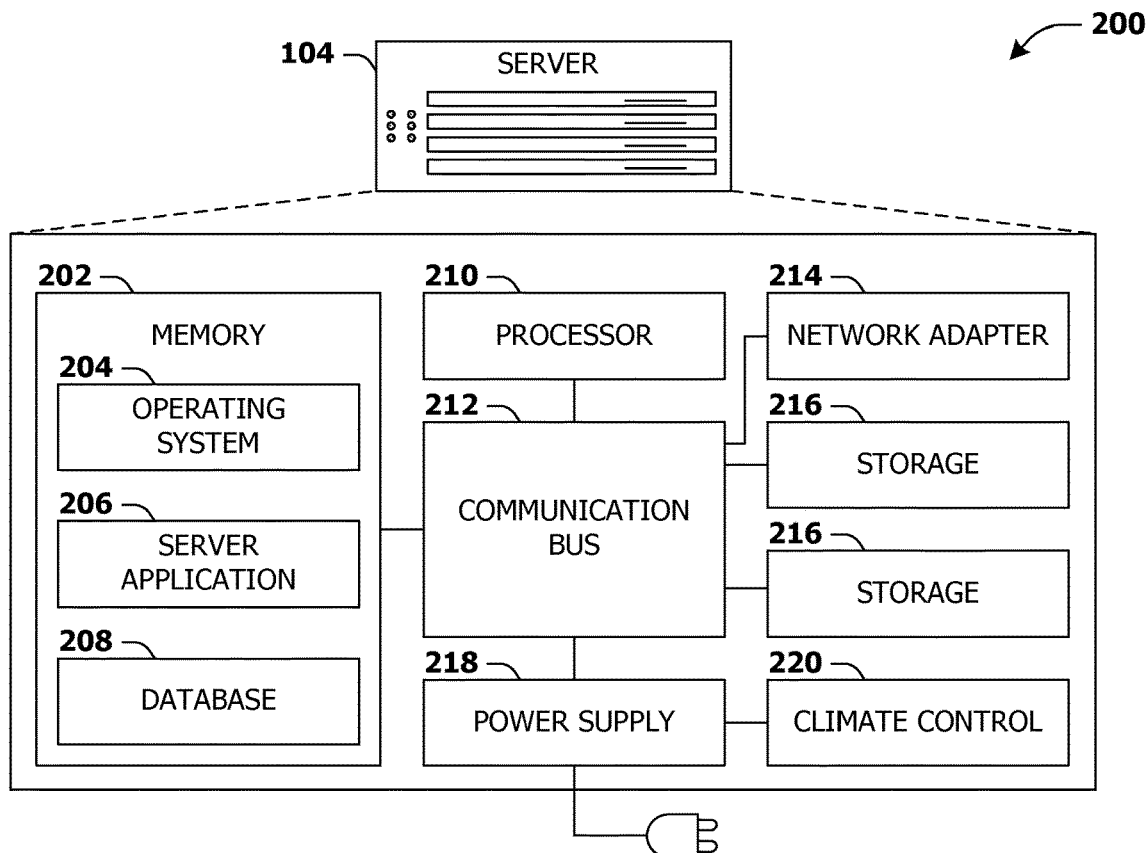
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
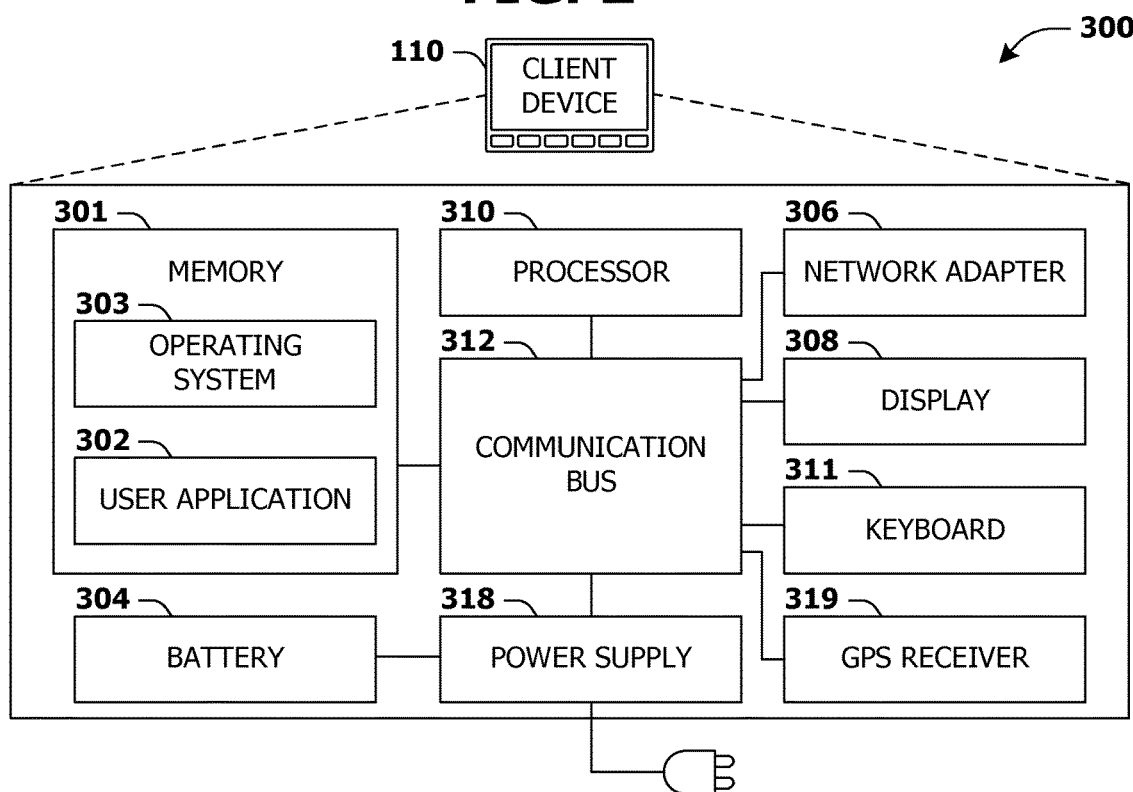
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for predicting content consumption are provided. A user viewing a program (e.g., a television show, a movie, a sporting event, etc.) may utilize an application (e.g., a social media application, a sports news application, a news application, etc.) during the program. There may be a correlation between events associated with the program (e.g., an advertisement, a song, a catchphrase, a performance, a half time show, and/or an appearance of an actor or actress during the program) and the application that the user is utilizing. For example, users may utilize an entertainment blogging application to talk about a particular character in the program, a character stating a popular line, or to talk about a surprise guest on the program. In an example, users may utilize a sports news application during a Sports show. A content provider of programs and/or applications may desire to present users with relevant content, such as content related to the programs and/or applications that the user views and/or with which the user interacts. However, if the content provider provides merely applications, then the content provider may lack a mechanism to determine what programs the user is viewing. Unfortunately, many content providers may lack the mechanism to determine program viewership (e.g., what programs the user is viewing) from application usage.

As provided herein, an application log of the user (comprising a user's application data such as what applications the user has executed) and a viewing log of the user (comprising the user's viewing data of content, such as television programs viewed by the user) may be evaluated over a time period to construct a model. The model may comprise a correlation between the viewing log and the application log during the time period (e.g., the time period may comprise a duration of a first program). Second application data, regarding application usage of a second user, may be extracted. The model may be applied to the second application data to identify an expected viewing action of the second user (e.g., what program the second user is likely to watch during the time period). The second user may be provided with content related to the expected viewing action. The content may be provided at specific times to avoid interrupting the program (such as during a commercial break, at an end of the program, etc.), which may increase user interaction and satisfaction with the content provider. The ability to provide users with relevant content may decrease an amount of time the second user may manually search for a product and/or service. Additionally, the ability to recommend an application (e.g., such as an application that is new to the second user) based upon the expected viewing action, may increase the second user's engagement and interaction with the content provider, as compared to a content provider that lacks an ability to recommend an application based upon an expected viewing action.

Second viewing data, regarding viewing actions of the second user, may be extracted. The model may be applied to the second viewing data to identify an expected application usage of the second user (e.g., what application the second user is likely to utilize during the time period). The ability to recommend a program (e.g., such as a program that is new to the second user) based upon the expected application usage, may increase the second user's engagement and interaction with the content provider, as compared to a content provider that lacks an ability to recommend an program based upon an expected application usage.

Figure 4A:
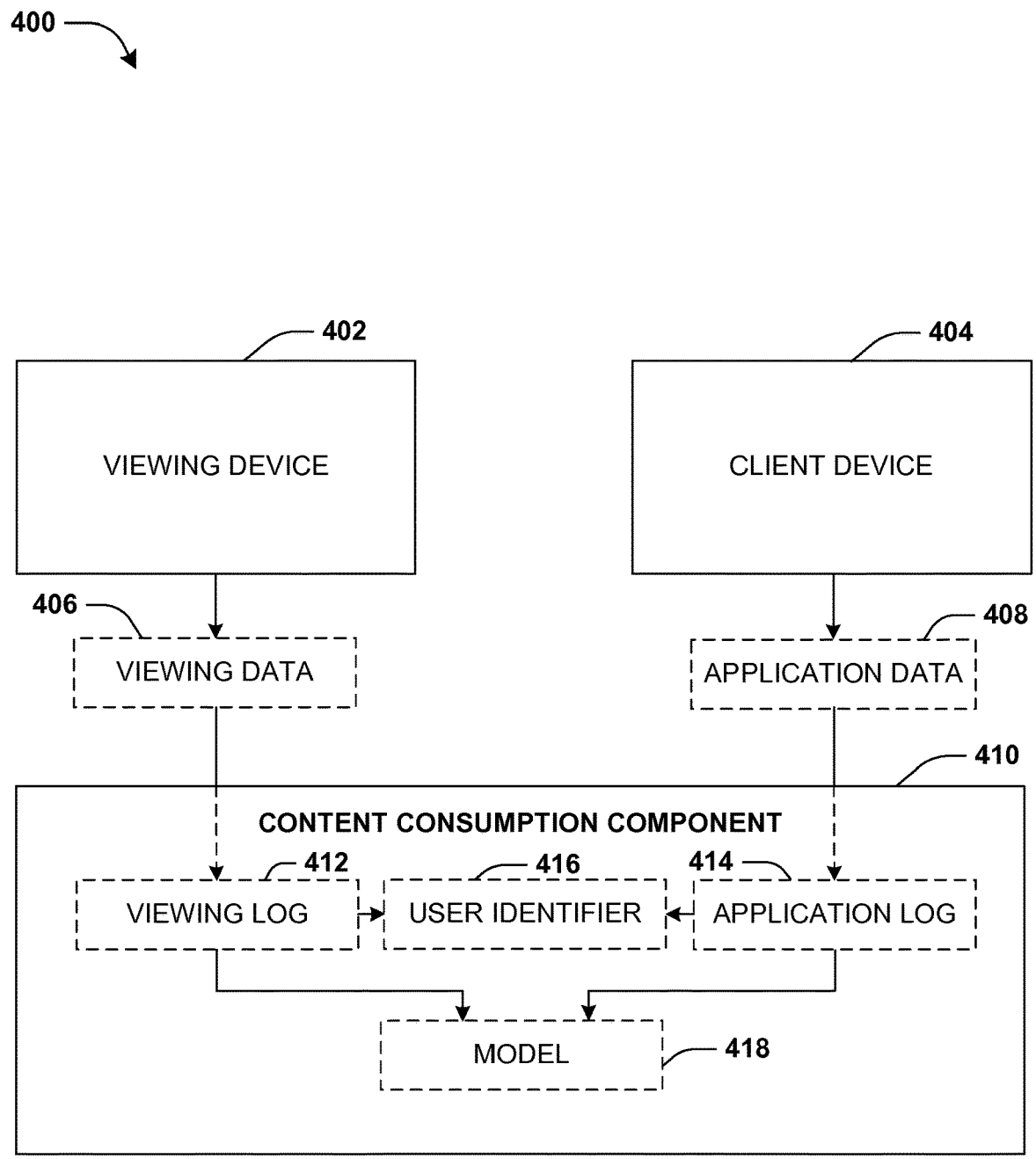
FIG. 4A is a component block diagram illustrating an example system for predicting content consumption, where a model is generated.
Figure 4B:
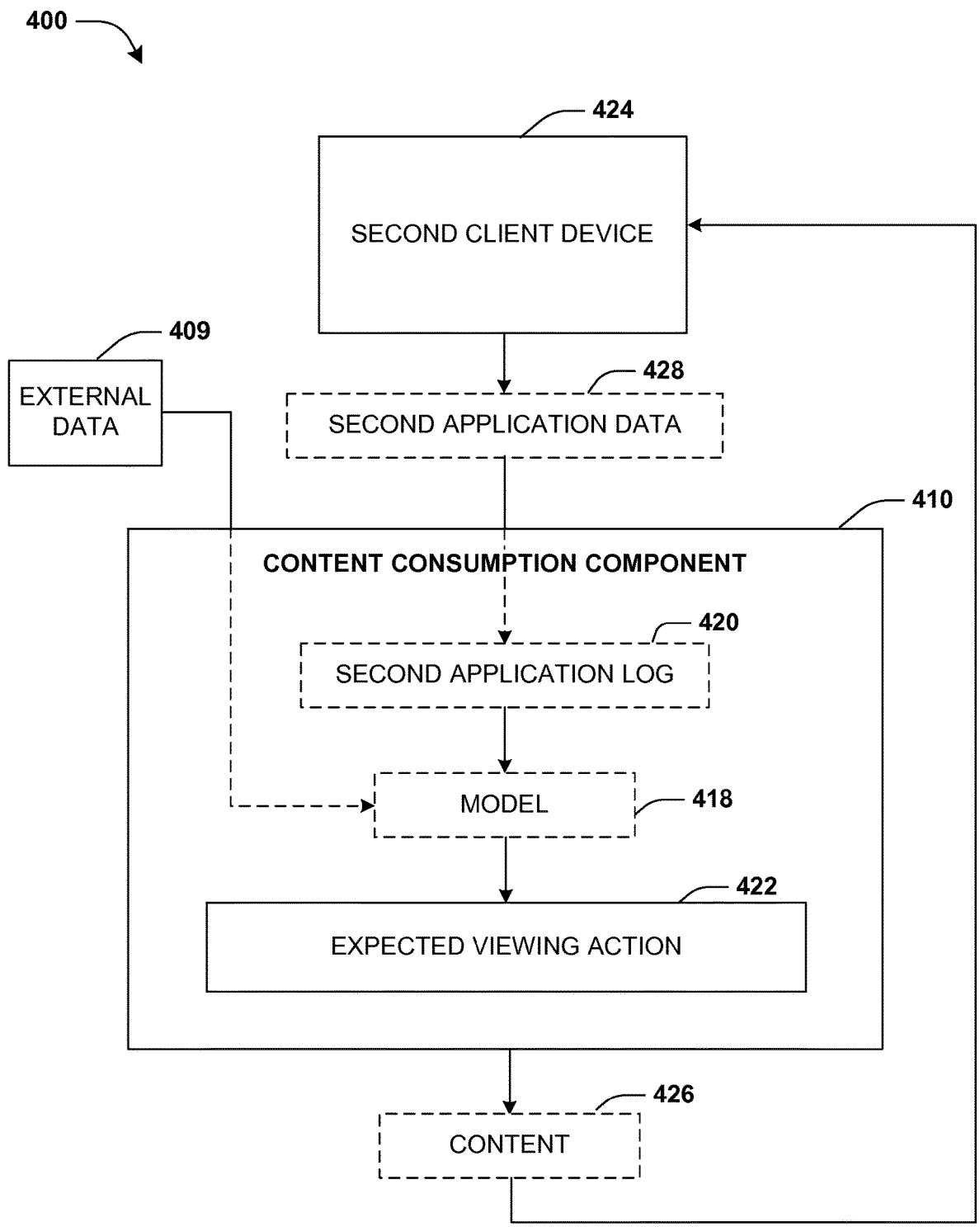
FIG. 4B is a component block diagram illustrating an example system for predicting content consumption, where a model is applied to a second application log.
Figure 4C:
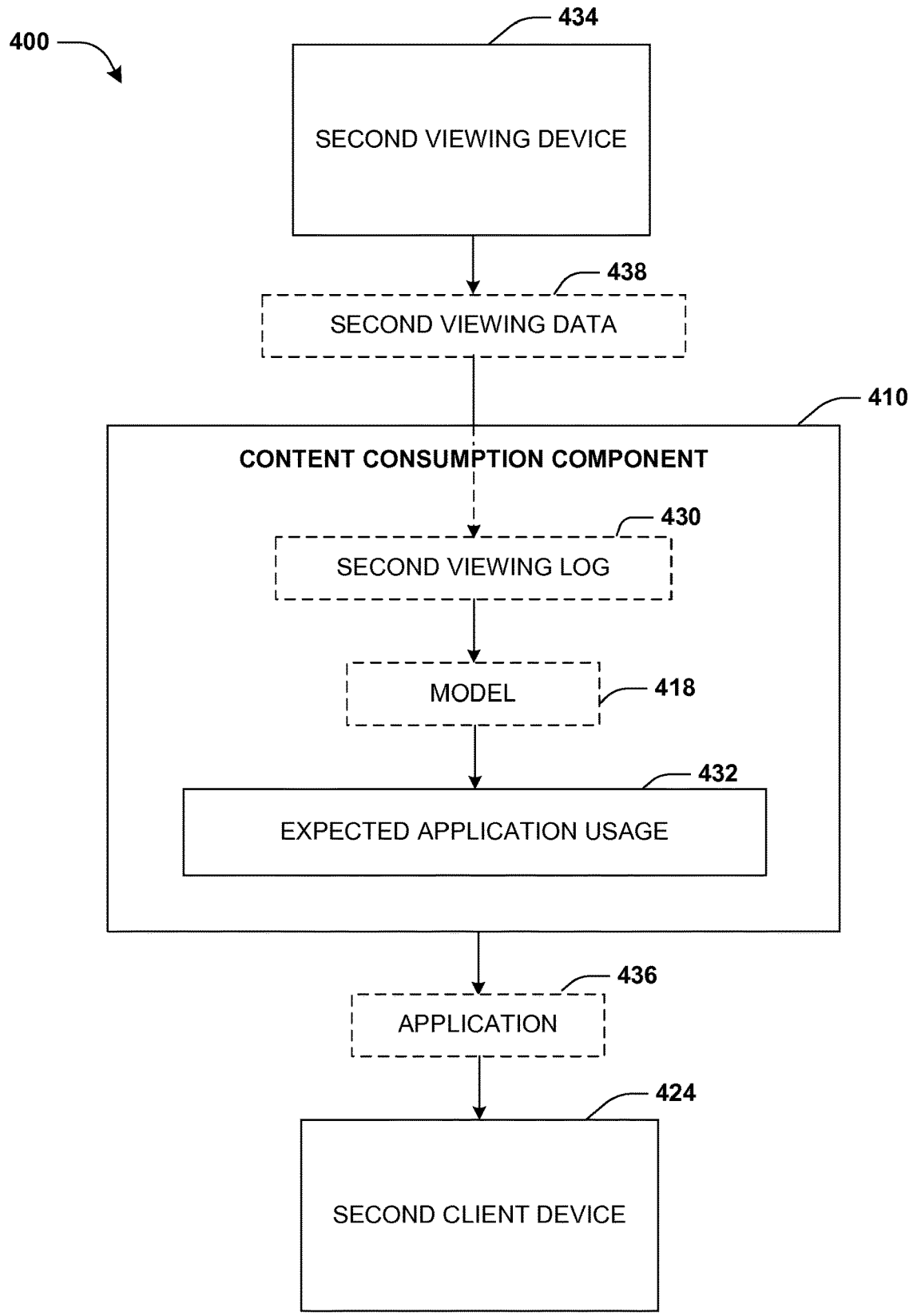
FIG. 4C is a component block diagram illustrating an example system for predicting content consumption, where a model is applied to a second viewing log.

FIGS. 4A-4C illustrate an example of a system 400, comprising a content consumption component 410, for generating a model 418. In an example, a user may view a program (e.g., a television show, a movie, a sporting event, a video, etc.) on a viewing device 402 (e.g., a television, a computer, a tablet, etc.). The viewing device 402 may provide viewing data 406 to the content consumption component 410. The viewing data 406 may be extracted by utilizing audio fingerprinting, visual matching, logging within a video playing application, and/or closed caption data. The viewing data 406 may indicate what is being viewed on the viewing device 402. The content consumption component 410 may generate a viewing log 412 from the viewing data 406. The viewing log 412 may comprise information about the user's viewing habits, such as when the user watches programs, which genre of programs the user watches, how much time does the user watch programs, etc.

In an example, the user may utilize an application (e.g., a social media application, a sports news application, a shopping application, a weather application, a movie ticket reservation application, a restaurant review application, a home renovation application, a videogame blog application, a news application, etc.) on a client device 404. The client device 404 may provide application data 408 to the content consumption component 410. In an example, the client device 404 may comprise the content consumption component 410. The content consumption component 410 may generate an application log 414 from the application data 408. The application log 414 may comprise information about the user's application utilization habits, such as when the user utilizes an application, which applications the user utilizes, how much time does the user utilize applications, etc. The user may take affirmative action, such as providing opt-in consent, to allow access to and/or use of the viewing data 406 and/or the application data 408 associated with accessing applications and/or programs from a content provider.

The content consumption component 410 may identify the user based upon the viewing device 402 and the client device 404 having a similar user identifier 416. The same user identifier 416 may comprise similar or shared login credentials (e.g., the user may be logged into the content provider account on the viewing device 402 through a social media account and the user may be logged onto the client device though an email account having a username associated with the social media account), account information (e.g., a user's name or home address), IP addresses, communication connections (e.g., the viewing device 402 may be connected to the client device 404, such as a Bluetooth connection between a mobile phone or smart device and a smart television), etc.

The viewing log 412 and the application log 414 may be evaluated over a time period (e.g., such as a duration of a program) to construct the model 418. The model 418 may comprise a correlation between the viewing log 412 and the application log 414 during the time period. For example, the model 418 may illustrate when the user, and/or multiple users associated with multiple viewing logs and multiple application logs, access applications relative to a timestamp in the program (e.g., a date and time during a program). The timestamp may correspond to an event (e.g., an advertisement, a song, a catchphrase, a performance, an event occurring during live programming content such as a guest appearance, an event occurring during a sitcom such as a character getting engaged, a marriage proposal during a sporting event, an appearance of an actor or actress during the program, etc.) occurring on the program. In an example, users may be more likely to engage with an entertainment blog application during advertisements shown during a Funny Comedy Show, whereas the users may be more likely to engage with a home renovation application during a Home Renovation Show as renovation ideas are discussed.

Because the content provider may lack a mechanism to directly determine other user's viewing habits of content, it may be advantageous to utilize the model 418 to determine/predict such information. Accordingly, FIG. 4B illustrates the content consumption component 410 identifying an expected viewing action 422 of a second user. The second user may access applications on a second client device 424. The second client device 424 may provide second application data 428 to the content consumption component 410. The content consumption component 410 may generate a second application log 420 from the second application data 428. The second application log 420 may comprise information about the second user's application utilization habits, such as when the second user utilizes an application, which applications the second user utilizes, for how much time does the second user utilize applications, etc. The content consumption component 410 may apply the model 418 to the second application log 420 to generate the expected viewing action 422 (e.g., a program with which the second user may be likely to view during the time period based upon the type of application used by the second user, such as a prediction that the second user may have an interest in watching a home renovation television show based upon the user interacting with a home renovation blog application in the evening). In an example, if the second application log 420 comprises application usage during the time period (e.g., from 8:00 pm to 8:30 pm on Friday night), then the second application log 420 may be applied to the model 418 that was derived from the viewing log 412 and the application log 414, of the user, generated during the time period (e.g., from 8:00 pm to 8:30 pm on Friday night).

External data 409 may be applied to the model 418. In an example, if the model 418 indicates that the expected viewing action 422 of the second user during the time period is one of a first program (e.g., Obscure Sport Show) or a second program (e.g., Sports World Championships), then the external data 409 may be utilized to identify the Sports World Championships as having more viewers than the Obscure Sport Show. The Sports World Championships may be assigned a higher likelihood score than the Obscure Sport Show. The likelihood score may be correlated to a degree of popularity of each show. The program with the higher likelihood score may be retained within the expected viewing action 422, while the other may be discarded. In an example, if the Sports World Championships has an average of 40 million viewers during the time period, and the Obscure Sport Show has an average of 40 thousand viewers during the time period, then the likelihood score for the Sports World Championships may be 1,000 times higher than the likelihood score for the Obscure Sports Show. Content 426 related to the expected viewing action 422 may be provided to the second client device 424. In an example, if the second user is viewing a Comedy Show starring Jim Famous, then the content 426 may comprise updates on the Comedy Show, news about Jim Famous, advertisements for the Comedy Show, advertisements of products shown on the Comedy Show, etc. Responsive to identifying the expected viewing action 422 comprising the program, information about the program may be added to a user interest profile of the second user. The content 426 may be recommended to the user based upon the user interest profile.

Because the content provider may lack a mechanism to directly determine other user's application usage, it may be advantageous to utilize the model 418 to determine/predict such information. Accordingly, FIG. 4C illustrates the content consumption component 410 identifying an expected application usage 432 of the second user. The second user may view programs on a second viewing device 434. The second viewing device 434 may provide second viewing data 438 to the content consumption component 410. The content consumption component 410 may generate a second viewing log 430 from the second viewing data 438. The second viewing log 430 may comprise information about the second user's viewing habits, such as when the second user watches programs, which genre of programs does the second user watch, how much time does the second user watch programs, etc. The content consumption component 410 may apply the model 418 to the second viewing log 430 to generate the expected application usage 432 (e.g., what applications might the second user be utilizing and/or interested in utilizing during the program). In an example, if the second viewing log 430 comprises viewing actions during the time period (e.g., 9:00 pm to 10:00 pm on Monday night), then the second viewing log 430 may be applied to the model 418 that was derived from the viewing log 412 and the application log 414, of the user, generated during the time period (e.g., 9:00 pm to 10:00 pm on Monday night).

An application 436 related to the expected application usage 432 may be provided to the second client device 424. In an example, if the second user is viewing a Nightly News Show that has a social network tie in (e.g., the Nightly News Show may feature social network news discussions and viewer commentary), then a social network commentary application may be recommended. In an example, the social network commentary application recommendation may be provided to the second user based upon the timestamp (e.g., the recommendation may be provided to the user during an advertisement).

Figure 5A:
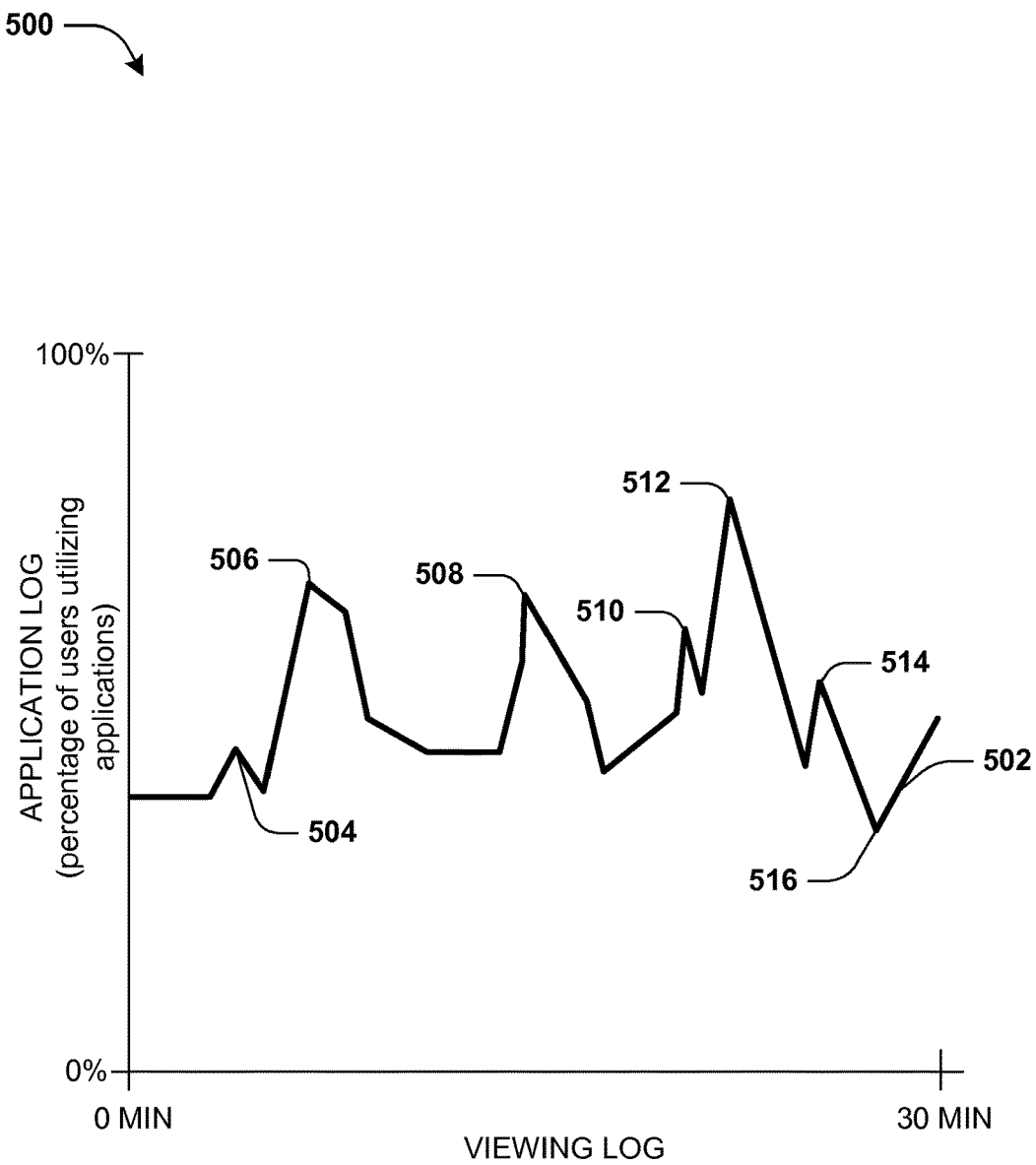
FIG. 5A is a component block diagram illustrating an example system for predicting content consumption, where model data of a user is illustrated.
Figure 5B:
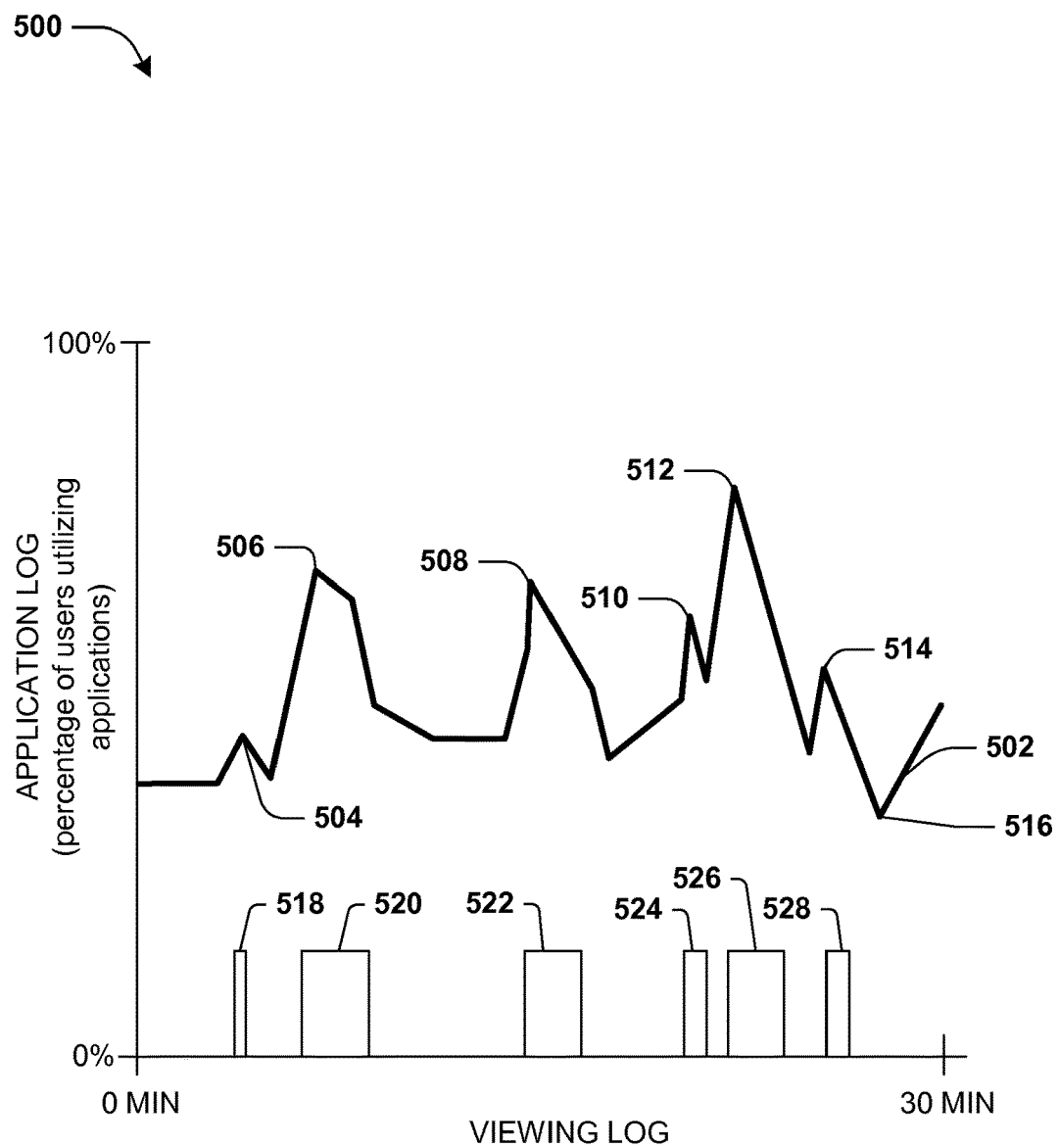
FIG. 5B is a component block diagram illustrating an example system for predicting content consumption, where model data of a user and a second user are illustrated.

FIGS. 5A-5B illustrate an example system 500 for predicting content consumption, where model data of a user and a second user are illustrated. An application log, comprising a percentage of users viewing a program while utilizing applications, is depicted on a y-axis. A viewing log, comprising a time (e.g., 0 minutes to 30 minutes) relative to the program, is depicted on an x-axis. A line 502 may depict the percentage of users utilizing applications while viewing the program over a duration of the program (e.g., where the program has a duration of 30 minutes). The line 502 may depict a first peak 504, a second peak 506, a third peak 508, a fourth peak 510, a fifth peak 512, and/or a sixth peak 514. The peaks 504-514 may depict increases in application usage by users viewing the program. In an example, the second peak 506 may coincide with a first advertisement (e.g., the users may focus on applications rather than the program during the first advertisement). In an example, a lull 516 may coincide with a climactic conclusion of the program, and thus the lull 516 may be a result of the conclusion drawing the user's attention to the program and away from the applications. The peaks 504-514 may correspond to instances where users are not viewing the program. Advertisers presenting advertisements during the program may be provided with an altered advertisement rate based upon a number of instances where users are not viewing the program.

FIG. 5B illustrates the model data for the user and the second user. A first spike 518, a second spike 520, a third spike 522, a fourth spike 524, a fifth spike 526, and/or a sixth spike 528 may depict a duration that the second user is utilizing applications (e.g., a width of a spike may correspond to a duration of the second user's application usage). In an example, the second user may be determined to be viewing the program, based upon the spikes 518-528 corresponding to the peaks 504-516. In an example, the more closely the spikes 518-528 correspond to the peaks 504-516 the higher a probability that the second user is viewing the program.

Figure 6:
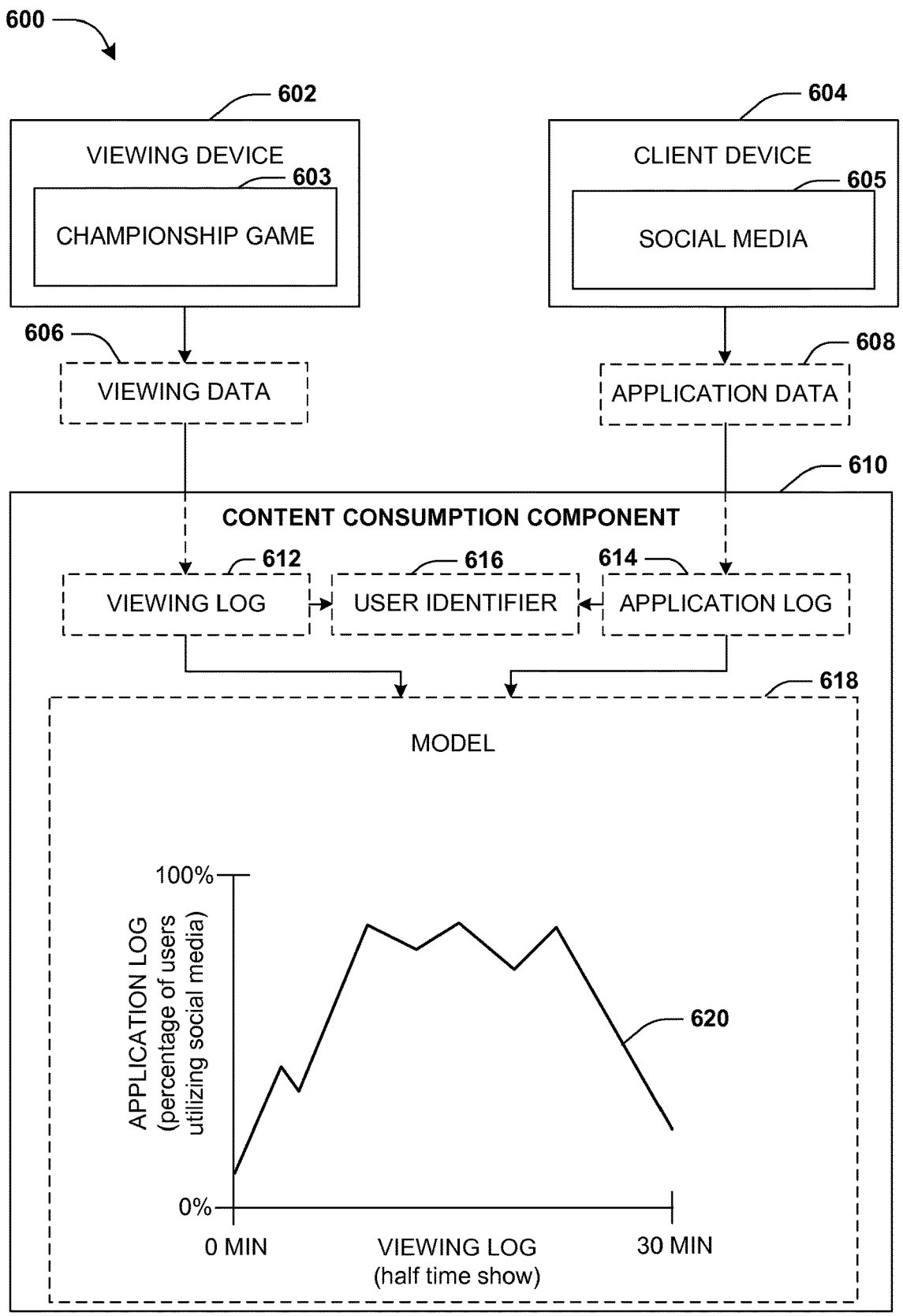
FIG. 6 is a component block diagram illustrating an example system for predicting content consumption, where a user is watching a championship game and utilizing social media.

FIG. 6 illustrates an example of a system 600, comprising a content consumption component 610, for generating a model 618. In an example, a user may view a championship game 603 on a viewing device 602. The viewing device 602 may provide viewing data 606 to the content consumption component 610. The content consumption component 610 may generate a viewing log 612 from the viewing data 606. In an example, the user may utilize a social media application 605 on a client device 604. The client device 604 may provide application data 608 to the content consumption component 610. The content consumption component 610 may generate an application log 614 from the application data 608.

The content consumption component 610 may identify the user based upon the viewing device 602 and the client device 604 having a similar user identifier 616. The viewing log 612 and the application log 614 may be evaluated over a time period (e.g., such as during a half time show) to construct the model 618. The model 618 may comprise a correlation between the viewing log 612 and the application log 614 during the time period.

The application log 614, comprising a percentage of users viewing a program while utilizing applications, may be depicted on a y-axis. The viewing log 612, comprising a time (e.g., 0 minutes to 30 minutes) relative to the half time show, may be depicted on an x-axis. A line 620 may depict the percentage of users utilizing the social media application 605 while viewing the half time show of the Championship Game 603. For example, the model 618 may illustrate that the user, or that multiple users associated with multiple viewing logs and multiple application logs, are utilizing the social media application 605 during the half time show. In an example, a relatively large percentage (e.g., greater than 70%) of the user(s) may utilize the social media application 605 during the half time show. Responsive to the model 618 indicating that the relatively large percentage of user(s) are utilizing the social media application 605, a second user, viewing the half time show, may be provided with a recommendation to utilize the social media application 605.

Figure 7:
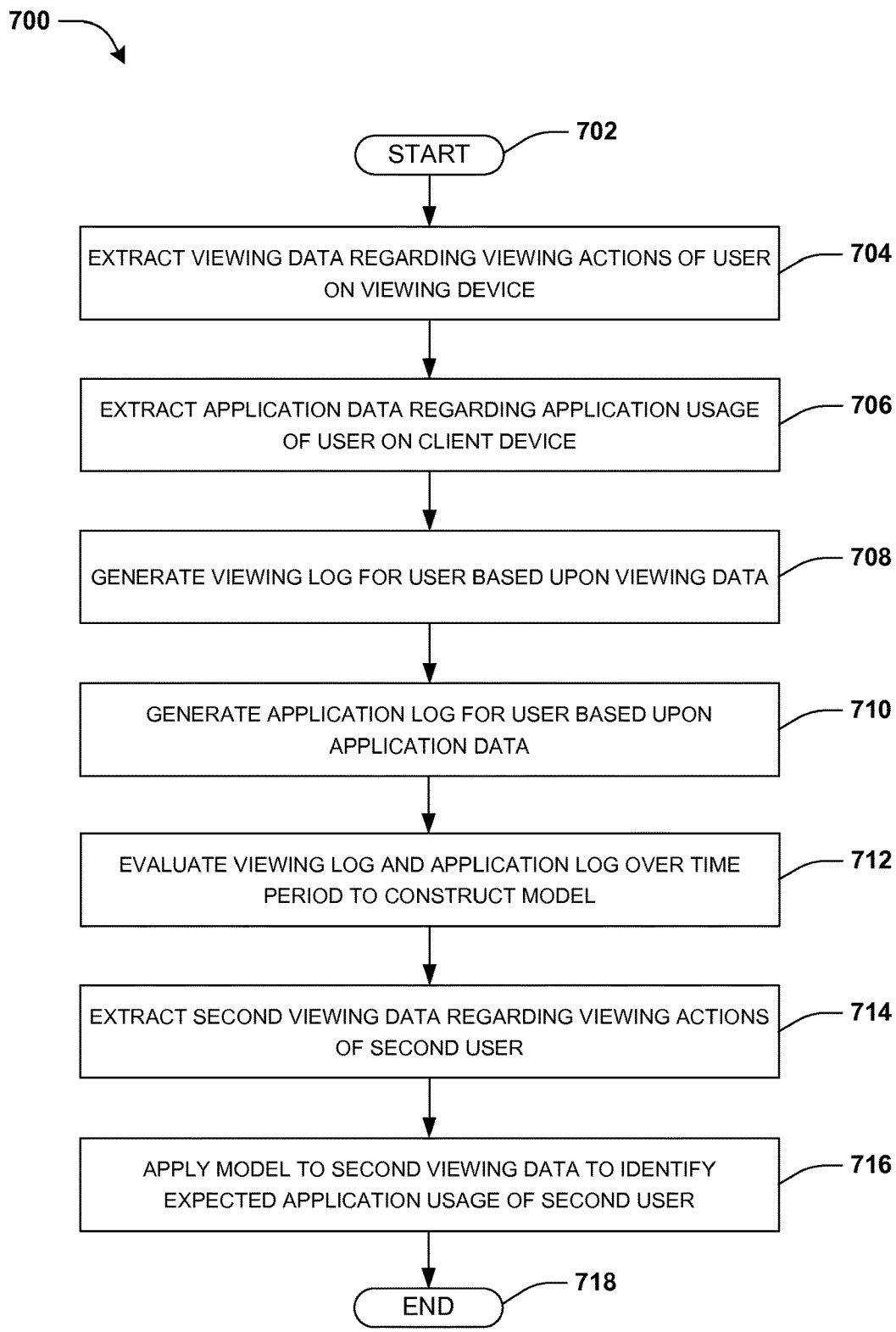
FIG. 7 is a flow chart illustrating an example method of predicting content consumption.

An embodiment of predicting content consumption is illustrated by an example method 700 of FIG. 7. At 702, the method 700 starts. At 704, viewing data, regarding viewing actions of a user on a viewing device, may be extracted. At 706, application data, regarding application usage of the user on a client device, may be extracted. At 708, a viewing log may be generated for the user based upon the viewing data. At 710, an application log may be generated for the user based upon the application data. At 712, the viewing log and the application log may be evaluated over a time period to construct a model. The model may comprise a correlation between the viewing log and the application log over the time period. At 714, second viewing data, regarding viewing actions of a second user, may be extracted. At 716, the model may be applied to the second viewing data to identity expected application usage of the second user (e.g., what application the second user may find relevant based upon the second user's viewing actions). At 718, the method 700 ends.

Figure 8:
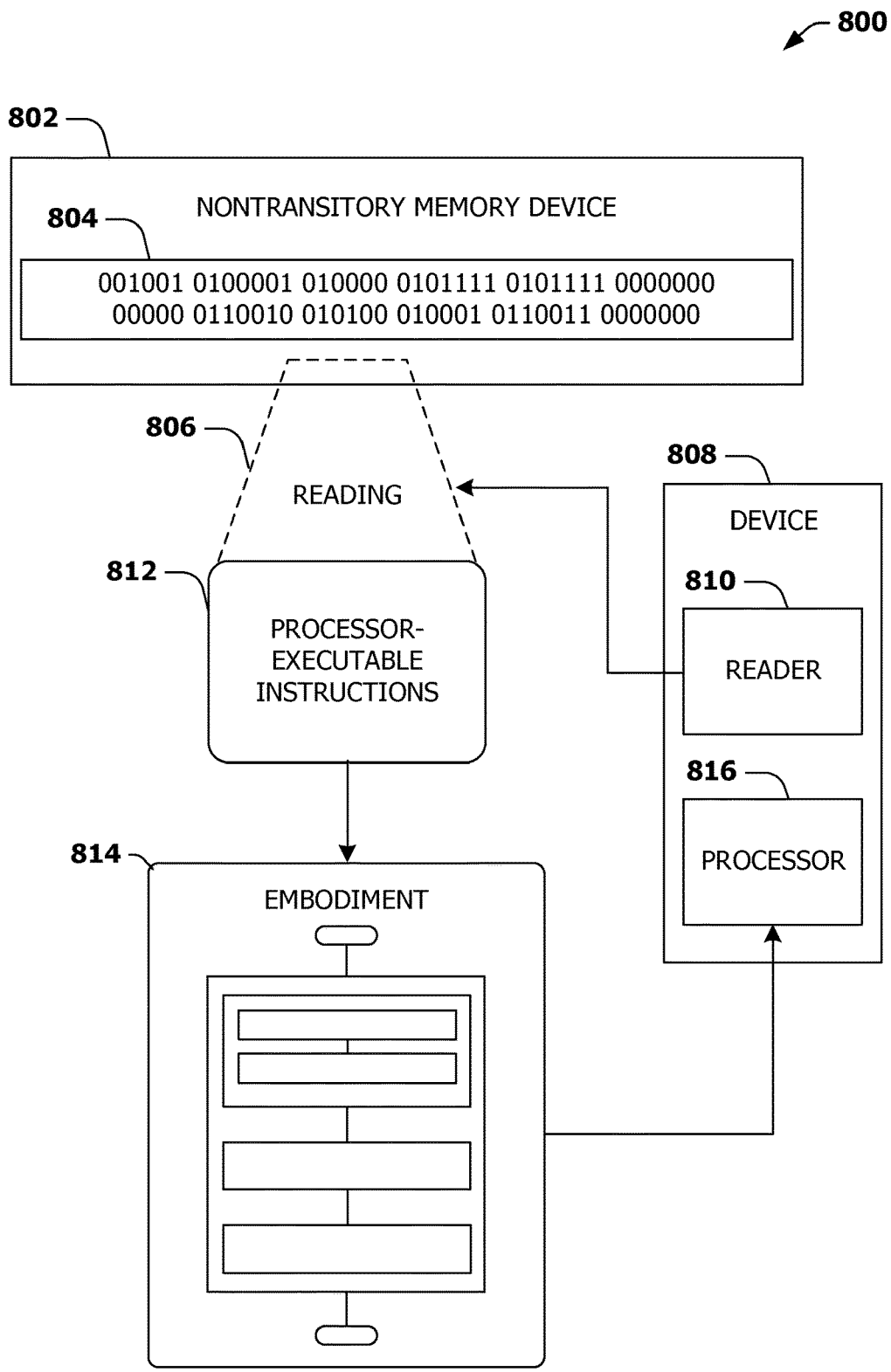
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 700 of FIG. 7, for example. In some embodiments, the processor-executable instructions, when executed on the processor 816 of the device 808, are configured to implement a system, such as at least some of the example system 400 of FIGS. 4A-4C, at least some of the example system 500 of FIGS. 5A-5B, and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for predicting content consumption, comprising:
  a processor; and
  memory comprising processor-executable instructions that when executed by the processor cause implementation of a content consumption component configured to:
    extract viewing data regarding viewing actions on a viewing device, wherein the viewing actions comprise a first viewing action;
    extract application data regarding application usage on a client device, the client device different than the viewing device, wherein the application usage comprises a first application usage;
    responsive to determining that the viewing device and the client device share a common login credential or address, determine that the viewing device and the client device are both associated with a first user;
    generate a viewing log, for the first user, based upon the viewing data;
    generate an application log, for the first user, based upon the application data;
    generate a model based upon (i) the viewing log corresponding to the viewing data regarding the viewing actions on the viewing device and (ii) the application log corresponding to the application data regarding the application usage on the client device, the model indicative of a plurality of correlations between one or more viewing actions on the viewing device and one or more application usages on the client device, wherein the plurality of correlations includes a first correlation between the first viewing action on the viewing device and the first application usage on the client device;
    extract second application data regarding application usage of a second user;
    responsive to identifying a similarity between at least some of the application usage of the second user and the first application usage associated with the first user based upon the model, identify the first viewing action correlated with the first application usage as an expected viewing action of the second user; and
    control transmission of content to a remote device of the second user based upon the expected viewing action.

2. The system of claim 1, the remote device of the second user different than the client device and different than the viewing device.

3. The system of claim 1, the address comprising an IP address.

4. The system of claim 1, the content consumption component configured to:
  identify a program specified in the viewing log;
  identify a timestamp in the program;
  identify an application that the first user utilizes during a time specified by the timestamp; and
  responsive to the expected viewing action indicating the second user is viewing the program, provide the second user with an application recommendation, comprising a recommendation of the application, based upon the timestamp.

5. The system of claim 4, the timestamp corresponding to an event comprising at least one of an advertisement, a song, a catchphrase, a performance, or an appearance of an actor or actress during the program.

6. The system of claim 1, the content consumption component configured to:
  extract the viewing data by utilizing at least one of audio fingerprinting, watermarking, visual matching, logging within a video playing application, or closed caption data.

7. The system of claim 1, the content consumption component configured to:
  identify a time during a program when a probability indicates the second user is not viewing the program.

8. The system of claim 1, the content consumption component configured to:
  apply external data about a program and a second program available to the viewing device; and
  responsive to the external data indicating a greater number of users are viewing the program as compared to the second program, construct the model to assign a higher likelihood score to the program relative to the second program.

9. The system of claim 1, the content consumption component configured to:
  responsive to identifying the expected viewing action comprising an identification of a program, add information about the program to a user interest profile of the second user.

10. A method for predicting content consumption, comprising:
  extracting viewing data regarding viewing actions on a viewing device, wherein the viewing actions comprise a first viewing action;
  extracting application data regarding application usage on a client device, the client device different than the viewing device, wherein the application usage comprises a first application usage;
  responsive to determining that the viewing device and the client device share a common login credential or address, determining that the viewing device and the client device are both associated with a first user;
  generating a viewing log, for the first user, based upon the viewing data;
  generating an application log, for the first user, based upon the application data;
  generating a model based upon the viewing log and the application log, the model indicative of a plurality of correlations between one or more viewing actions and one or more application usages, wherein the plurality of correlations includes a first correlation between the first viewing action and the first application usage;
  extracting second viewing data regarding viewing actions of a second user;
  responsive to identifying a similarity between at least some of the viewing actions of the second user and the first viewing action associated with the first user based upon the model, identifying the first application usage correlated with the first viewing action as an expected application usage of the second user; and controlling transmission of content to a remote device of the second user based upon the expected application usage.

11. The method of claim 10, the content comprising an application recommendation related to the expected application usage.

12. The method of claim 10, the address comprising an IP address.

13. The method of claim 10, comprising:
identifying a program specified in the viewing log;
identifying a timestamp in the program;
identifying an application that the first user utilizes during a time specified by the timestamp; and
responsive to an occurrence of the time, recommending the application to the second user.

14. The method of claim 13, the timestamp corresponding to an event comprising at least one of an advertisement, a song, a catchphrase, a performance, or an appearance of an actor or actress during the program.

15. The method of claim 10, comprising:
extracting the viewing data by utilizing at least one of audio fingerprinting, watermarking, visual matching, logging within a video playing application, or closed caption data.

16. The method of claim 10, comprising:
identifying a time during a program when a probability indicates the second user is not viewing the program because the second user is utilizing an application.

17. The method of claim 10, comprising:
responsive to identifying the expected application usage comprising an identification of an application, adding information about the application to a user interest profile of the second user.

18. A system for predicting content consumption, comprising:
a processor; and
memory comprising processor-executable instructions that when executed by the processor cause implementation of a content consumption component configured to:
extract viewing data regarding viewing actions of a user on a viewing device, wherein the viewing actions comprise a first viewing action;
extract application data regarding application usage of the user on a client device, wherein the application usage comprises a first application usage;
generate a viewing log, for the user, based upon the viewing data;
generate an application log, for the user, based upon the application data;
generate a model based upon (i) the viewing log corresponding to the viewing data regarding the viewing actions of the user on the viewing device and (ii) the application log corresponding to the application data regarding the application usage of the user on the client device, the model indicative of a plurality of correlations between one or more viewing actions on the viewing device and one or more application usages on the client device, wherein the plurality of correlations includes a first correlation between the first viewing action on the viewing device and the first application usage on the client device;
extract second application data regarding application usage of a second user;
responsive to identifying a similarity between at least some of the application usage of the second user and the first application usage associated with the user based upon the model, identify the first viewing action correlated with the first application usage as an expected viewing action of the second user; and
control transmission of content to a remote device of the second user based upon the expected viewing action.

19. The system of claim 18, the content consumption component configured to:
identify the user based upon the viewing device and the client device sharing an identifier, the identifier comprising at least one of login credentials, account information, an IP address, or a communication connection.

20. The system of claim 18, the content consumption component configured to:
identify an application that the user utilizes during a time specified by a timestamp in a program specified in the viewing log; and
responsive to identifying viewing the program as the expected viewing action, provide the second user with an application recommendation comprising recommending the application based upon the timestamp.

* * * * *